US009732923B2

(12) United States Patent
Schug et al.

(10) Patent No.: US 9,732,923 B2
(45) Date of Patent: Aug. 15, 2017

(54) INTEGRAL LIGHTING ASSEMBLY

(75) Inventors: Josef Andreas Schug, Wuerselen (DE); Benno Spinger, Aachen (DE)

(73) Assignee: KONINKLIJKE PHILIPS N.V., Eindhoven (NL)

(*) Notice: Subject to any disclaimer, the term of this patent is extended or adjusted under 35 U.S.C. 154(b) by 510 days.

(21) Appl. No.: 13/635,798

(22) PCT Filed: Mar. 21, 2011

(86) PCT No.: PCT/IB2011/051158
§ 371 (c)(1),
(2), (4) Date: Sep. 18, 2012

(87) PCT Pub. No.: WO2011/117795
PCT Pub. Date: Sep. 29, 2011

(65) Prior Publication Data
US 2013/0021812 A1 Jan. 24, 2013

(30) Foreign Application Priority Data
Mar. 23, 2010 (EP) .................................... 10157348

(51) Int. Cl.
*B60Q 3/04* (2006.01)
*F21S 8/10* (2006.01)
*F21V 7/00* (2006.01)

(52) U.S. Cl.
CPC ....... *F21S 48/1154* (2013.01); *F21S 48/1258* (2013.01); *F21S 48/1283* (2013.01);
(Continued)

(58) Field of Classification Search
CPC ............... F21S 48/1266; F21S 48/1258; F21S 48/1338; F21S 48/1376; F21S 48/1154;
(Continued)

(56) References Cited

U.S. PATENT DOCUMENTS 1,251,211 A * 12/1917 Forger ................ F21S 48/1233 362/339
1,454,671 A * 5/1923 Dunlea ................... F21V 11/00 362/327

(Continued)

FOREIGN PATENT DOCUMENTS

CN 101061345 A 10/2007
DE 19981029452 A1 1/2000

(Continued)

OTHER PUBLICATIONS

Moisel, Illuminating device for vehicle, has light emitting diode field with light emitting diode as source of light, where optical element is arranged in radiation direction of light emitting diode, Mar. 4, 2010.*

(Continued)

*Primary Examiner* — Jong-Suk (James) Lee
*Assistant Examiner* — James Endo

(57) ABSTRACT

The invention describes an integral lighting assembly (1A, 1B, 1C, 1D, 1E) comprising an optical arrangement (2, 3); a first light source ($S_1$) for generating a first beam ($L_1$) of light; a first collimator ($C_1$) for directing the first beam ($L_1$) at the optical arrangement (2, 3); a second light source ($S_2$) for generating a second beam ($L_2$) of light; and a second collimator ($C_2$) for directing the second beam ($L_2$) at the optical arrangement (2, 3), wherein the optical arrangement (2, 3) is realized to manipulate the first and second light beams ($L_1$, $L_2$) to give a first exit beam (BLO) and a second exit beam (BRI) such that the first exit beam (BLO) and the second exit beam (BRI) are partially combined in an overlap region (44) on a projection plane (4) located at a predefined distance from the integral lighting assembly (1A, 1B, 1C, 1D, 1E). The invention further describes an automotive
(Continued)

headlamp arrangement (12) comprising such an integral lighting assembly (1A, 1B, 1C, 1D, 1E).

16 Claims, 7 Drawing Sheets

(52) U.S. Cl.
CPC ......... *F21S 48/1747* (2013.01); *F21S 48/115* (2013.01); *F21S 48/1159* (2013.01); *F21S 48/125* (2013.01); *F21S 48/1216* (2013.01); *F21S 48/1715* (2013.01); *F21V 7/0008* (2013.01)

(58) Field of Classification Search
CPC ............... F21S 48/1283; F21S 48/1747; F21S 48/1159; F21S 48/115; F21S 48/1216; F21S 48/1233; F21S 48/125; F21S 48/1275; F21S 48/1291; F21S 48/1225; F21S 48/1715
USPC ....... 362/245, 487, 522, 521, 538, 543, 544, 362/545, 244; 359/641
See application file for complete search history.

(56) References Cited

U.S. PATENT DOCUMENTS

| | | | | |
|---|---|---|---|---|
| 1,897,202 | A * | 2/1933 | Lehman | F21S 48/1233 362/309 |
| 2,122,465 | A * | 7/1938 | Graves | F21S 48/1233 362/214 |
| 3,743,385 | A * | 7/1973 | Schaefer | F21S 48/1258 359/718 |
| 4,562,519 | A * | 12/1985 | Deves | 362/308 |
| 4,914,747 | A * | 4/1990 | Nino | F21S 48/1172 313/115 |
| 5,023,758 | A | 6/1991 | Allen | |
| 7,607,811 | B2 * | 10/2009 | Okada | 362/545 |
| 7,611,272 | B2 | 11/2009 | Specht | |
| 8,038,334 | B2 * | 10/2011 | Ishida | 362/539 |
| 8,596,841 | B2 * | 12/2013 | Yagi et al. | 362/509 |
| 2005/0068787 | A1 * | 3/2005 | Ishida | 362/538 |
| 2006/0120094 | A1 | 6/2006 | Tsukamoto | |
| 2007/0086202 | A1 * | 4/2007 | Tsukamoto et al. | 362/514 |
| 2008/0080201 | A1 | 4/2008 | Specht | |
| 2008/0198574 | A1 | 8/2008 | Woodward | |
| 2008/0253141 | A1 | 10/2008 | Nakada et al. | |
| 2009/0021942 | A1 * | 1/2009 | Kim | 362/268 |
| 2009/0080210 | A1 * | 3/2009 | Reiners et al. | 362/523 |
| 2009/0097247 | A1 | 4/2009 | Tseng | |
| 2009/0180293 | A1 | 7/2009 | Eberhardt et al. | |
| 2009/0196060 | A1 * | 8/2009 | Sazuka et al. | 362/509 |
| 2009/0231873 | A1 * | 9/2009 | Kotajima et al. | 362/516 |
| 2009/0257240 | A1 * | 10/2009 | Koike | 362/538 |
| 2010/0027284 | A1 * | 2/2010 | Ackermann | F21S 48/1154 362/516 |
| 2010/0226142 | A1 * | 9/2010 | Brendle et al. | 362/512 |

FOREIGN PATENT DOCUMENTS

| | | | |
|---|---|---|---|
| DE | 102007040760 | A1 * | 3/2009 |
| DE | 102008036192 | A | 2/2010 |
| DE | 102008045166 | A1 | 3/2010 |
| EP | 0591566 | A1 * | 4/1994 |
| EP | 1980787 | A1 | 10/2008 |
| EP | 2037167 | A2 | 3/2009 |
| JP | 2005317226 | A | 10/2005 |
| RU | 2339523 | C1 | 11/2008 |
| RU | 78739 | U1 | 12/2008 |

OTHER PUBLICATIONS

Rosenhahn, Projection module for vehicle headlight, has secondary optical arrangement, which is formed as one-piece or multi-part complex lens and has multiple lens segments, Mar. 5, 2009.*

Decision on Grant dated Jan. 23, 2015, Russian Application No. 2012144819, 14 pages.

EPO as ISA, PCT/IB2011/051158 filed Mar. 21, 2011, "International Search Report and Written Opinion" dated Jun. 1, 2011, 13 pages.

First Office Action dated Jun. 10, 2014, China Application No. 201180015246.0, 13 pages.

Grant Notification dated Nov. 28, 2014, China Application No. 201180015246.0, 3 pages.

Office Action dated May 12, 2015, Japan Application No. 2013-500634, 4 pages.

* cited by examiner

INTEGRAL LIGHTING ASSEMBLY

CROSS REFERENCE TO RELATED APPLICATION

This application is a National Stage Application of International Application No. PCT/IB2011/051158, filed on Mar. 21, 2011, and claims priority to European Patent Office Application No. EP 10157348.3, filed on Mar. 23, 2010.

FIELD OF THE INVENTION

The invention describes an integral lighting assembly and an automotive headlamp arrangement.

BACKGROUND OF THE INVENTION

In lighting assemblies used in automotive applications, for example, a particular requirement is that the bright/dark "cut-off" line of the light output by the lighting assembly satisfies certain regulations. Furthermore, this bright/dark cut-off line should be adaptable. The overall beam of light output by the lighting assembly should be adjustable, for example, to produce a low beam for illuminating the region directly in front of the vehicle and a high beam for extending the illuminated area. Adaptability of the light output is also desirable in certain situations, such as when driving into a bend, so that the area in the bend can be better illuminated with a resulting increase in safety. Furthermore, it may be advantageous to influence the amount of light in the foreground of the beam pattern, i.e. in a region of the beam closest to the vehicle, depending on traffic conditions and/or terrain, weather conditions, etc.

The high beam and low beam have conventionally been generated using separate light sources in two separate lighting arrangements. Using conventional filament lamps or gas-discharge lamps, generally two lighting units are mounted in close proximity in a headlamp arrangement and configured so that the high beam and low beam are projected correctly into the relevant regions in front of the vehicle. Although headlamp optical systems do not use true "imaging" optics, usually one edge of the source or an edge of a shield element is "imaged" in order to obtain the required cut-off for the beam distribution. The quality of the light beams must satisfy certain requirements. For example, the shapes or contours of the light beams that would be projected onto a vertical transverse plane located at a standard distance from the headlamp, e.g. 25 meters, are covered by national and international specifications such as ECE (Economic Commission for Europe) R112.

Lighting units or lighting assemblies using semiconductor light sources such as light-emitting diode (LED) chips are becoming more popular as advances in technology have led to economic and yet very bright semiconductor light sources. Since semiconductor light sources are compact, it would be convenient to combine two such light sources for two different beam functions into a single arrangement. However, known solutions have not shown satisfactory results. Because the light from each light source is directed at the single optical element, the physical separation between the two sources is also imaged and appears as a 'gap' between the projected beams, for example as a dark area between a low beam and a high beam. Even a minimal gap between the light source images results in a visual gap in the beam distribution. This can be a safety hazard when driving, since anything in this region is effectively invisible to the driver. In particular the verge or curb region to the side of the vehicle is critical, since pedestrians, animals or hazards in this region are then effectively invisible to the driver. Furthermore, because the secondary optic is 'shared', it must of necessity be larger, and the overall arrangement is about as large as an arrangement having separate optical systems for each function, so that the advantage of a compact light source is lost. The optical element could be designed to distort the beams in order to close this gap, but such a distortion unavoidably has a detrimental effect on the bright/dark cut-off line, which may then no longer satisfy the requirements. Furthermore, any corrective measures of the optical element affect both beams, so that a controlled correction of separate beams is not feasible.

Therefore, it is an object of the invention to provide an improved lighting arrangement that avoids the problems mentioned above.

SUMMARY OF THE INVENTION

The object of the invention is achieved by the integral lighting assembly of claim 1, and by the automotive headlamp arrangement of claim 14.

According to the invention, an integral lighting assembly comprises an optical arrangement, a first light source for generating a first beam of light and a first collimator for directing the first beam at the optical arrangement, and a second light source for generating a second beam of light and a second collimator for directing the second beam at the optical arrangement, whereby the first and second beams are directed at essentially separate regions of the optical arrangement. Thereby, the optical arrangement is realized to manipulate the first and second light beams to give a first exit beam and a second exit beam such that the first exit beam and the second exit beam at least partially overlap in an overlap region on a projection plane located at a predefined distance from the integral lighting assembly. The 'projection plane' is to be understood as a virtual plane or screen at a standard distance from the integral lighting arrangement, whereby the distance depends on the application for which the integral lighting arrangement is used. For example, for an automotive headlamp application, the standard ECE R112 mentioned in the introduction requires that such a virtual projection plane be located vertically in front of the vehicle, transverse to the direction of travel, and at a norm distance of 25 m from the headlamp arrangement.

An obvious advantage of the integral lighting assembly according to the invention is that a region in front of the vehicle is always optimally illuminated, without any dark or non-illuminated 'gap' between the two exit beams. Furthermore, this can be achieved without having separate units, for example for 'low-beam' and 'high-beam' arrangements. This does away with the need for careful alignment of separate lighting units that is required for prior art solutions. The separation of the first and second beams upon arrival at the optical arrangement allows the optical arrangement to separately manipulate the exit beams to give the desired overlap region on the projection plane. Furthermore, since the first exit beam and second exit beam are realized using a single optical arrangement, the overall integral lighting arrangement can be realized in a cost-effective manner.

According to the invention, an automotive headlamp arrangement comprises such an integral lighting assembly. With the integral lighting arrangement according to the invention, it is possible to structure the beam for each beam function and still obtain a compact optical system, which is attractive for cost-effective LED headlamp solutions.

The dependent claims and the following description disclose particularly advantageous embodiments and features of the invention. Features of the embodiments may be combined as appropriate to arrive at further embodiments.

In the following, without restricting the invention in any way, it may be assumed for some realizations that the first and second collimators are arranged one above the other, so that the first and second beams are projected one above the other. In this case, one collimator may be referred to as the 'upper' collimator and the other may be referred to as the 'lower' collimator. Also, for the sake of simplicity, the first exit beam may be referred to in the following as a 'low' beam, and the second exit beam may be referred to as a 'high' beam. In some realizations which will be described below, the collimators may be arranged essentially symmetrically about an optical axis of the optical arrangement.

The integral lighting arrangement according to the invention can be used to simply refract or deflect the light from the first light source in the optical arrangement (also referred to in the following as the 'secondary optic') to give a first exit beam, and similarly to refract or deflect the light from the second light source to give a second exit beam. However, it can be advantageous to manipulate the first and second beams so that the first and second exit beams satisfy certain functional requirements. Therefore, in a preferred embodiment of the invention, the optical arrangement of the integral lighting assembly comprises a spreading element for horizontally spreading any light incident at the spreader element and/or a shifting element for vertically shifting any light incident at the shifting element. The secondary optic can be only partially covered by these additional functional elements, or they can essentially completely cover the secondary optic.

In automotive applications, a low beam or fog beam is used to illuminate a lower region in front of the vehicle. It is desirable to illuminate as wide an area as possible, in particular to illuminate the side of the road closer to the verge. Therefore, in a particularly preferred embodiment of the invention, the spreading element is realized to spread at least part of the first beam prior to manipulation by the optical arrangement such that the first exit beam is projected to give two overlapping first beam regions in the projection plane. These first beam regions comprise essentially a wider, more 'stretched' low beam as well as a non-manipulated low beam.

In automotive applications, a high beam is preferably not only directed upwards, but also partly downwards so that the road is well illuminated. Therefore, in a particularly preferred embodiment of the invention, the shifting element is realized to shift at least part of the second beam prior to manipulation by the optical arrangement such that the second exit beam is projected to give two overlapping second beam regions in the projection plane. In this way, the manipulated part of the high beam can be 'pushed down' to overlap the low beam region, while the non-manipulated part of the high beam remains dedicated to the illumination of a higher region in front of the vehicle.

In one embodiment of the invention, the optical arrangement preferably comprises a projection lens. A shifting element and/or a spreading element can be realized by mounting or attaching suitably shaped micro-structures on the back of the lens (i.e. the side of the lens facing towards the light sources). These micro-structures act to generate the optimal beam shape for each function. For example, in a preferred embodiment of the invention, the shifting element comprises a plurality of prism elements mounted on the projection lens and arranged to vertically shift the light incident at the shifting element prior to refraction by the projection lens. A series of such thin prism elements can be attached to a region of the lens and be arranged for example to shift the light away from the optical axis, prior to refraction by the projection lens. These prism elements can be used to shift part of the high beam, for example in a downward direction, so that the high beam illuminated area comprises two high beam regions, giving a more optimal beam performance.

In another preferred embodiment of the invention, the spreading element comprises a plurality of cylindrical lens elements mounted on the projection lens and arranged to refract and horizontally spread the light incident at the spreader element prior to refraction by the projection lens. For example, a series of half-cylinder lenses can be attached to one region of the lens in order to refract and horizontally spread the incoming beam of light prior to refraction by the projection lens, for example to at least partially spread the low beam, so that the low beam illuminated area comprises two low beam regions, giving a more optimal low-beam performance.

Alternatively, the optical arrangement can comprise a reflector enclosing the collimators and open at one end to allow the light beams to be directed outwards. In an integral lighting arrangement using a reflector, a shifting element and/or spreading element can be formed by manipulating the surface of the reflector, for example by creating suitably shaped facets in certain regions of the reflector. In an integral lighting arrangement realized using a reflector instead of a lens, the collimators are not necessarily arranged symmetrically about an optical axis of the reflector, and the reflector itself may be realized in an asymmetric manner.

A separation of the beams upon arrival at the secondary optic is desirable for the purpose of an optimal beam shaping. Therefore, in one preferred embodiment of the invention, the integral lighting assembly comprises a collimator arrangement in which each collimator is arranged to direct its beam of light essentially at a region of the optical arrangement on the same side of an optical axis of the integral lighting assembly such that the first beam and the second beam overlap by at most 20°, more preferably at most 15°, most preferably at most 10° in a first/second beam overlap before arriving at the optical arrangement and wherein the projection plane overlap region corresponds to the first/second beam overlap. By appropriately shaping the collimators, it can be achieved that little or no light from a collimator crosses the optical axis. This optimal partial beam separation on the secondary optic can be achieved by using a "bi-cavity" collimator having only a thin dividing wall between the two neighboring cavities, i.e. the two collimators may be essentially realized as a single entity. Preferably, therefore, the first and second collimators are realized as a bi-cavity structure with a shared dividing wall, whereby each collimator comprises an essentially parabolic outer wall, which parabolic outer wall comprises a focal point close to the shared dividing wall. The advantage of such realizations over known prior art solutions is that the special near-die collimators allow a favorable directional partial separation of the beams originating from the two light sources. This leads to a corresponding partial separation on the secondary optic. In these areas, the beams for the two separate light functions (e.g. high beam; low beam) can be shaped individually, whereas the overlap area allows for a more compact headlamp system.

A beam separation can be obtained in an alternative manner. In another preferred embodiment of the invention, therefore, the integral lighting assembly comprises a collimator arrangement in which the collimators are arranged such that a collimator on one side of an optical axis of the lighting assembly directs its beam of light essentially at a region of the optical arrangement on the other side of the optical axis so that the first beam crosses the second beam before arriving at the optical arrangement. In other words, an 'upper' collimator is arranged to direct its beam of light at a 'lower' region of the secondary optic, and a 'lower' collimator directs its beam of light at an 'upper' secondary optic region. Light beams passing through the focal point of a secondary optic will leave the secondary optic in an essentially parallel manner. In other words, for this 'crossing beams' realization, the light 'on' the focal plane that originates from the light exit opening of a collimator will effectively be projected by the optical arrangement to create the 'image' of that light exit opening. Therefore, in a high beam/low beam application, the 'upper' light source can be used to generate the low beam, while the 'lower' light source is used to generate the high beam. This realization is quite advantageous, since the collimator design can be favorably simple. The light sources, or more precisely the light exit openings of the collimators, are imaged on the virtual screen or projection plane. To obtain the desired overlap in the projection plane, the secondary optic can be modified by adding an additional functional element, for example a prism element, to shift part of the low beam upward, or part of the high beam downward, to obtain the desired overlap region.

In a preferred embodiment of the invention, however, the projection plane overlap region is obtained by manipulating the first and second beam appropriately before they arrive at the secondary optic. Therefore, in a particularly preferred embodiment of the invention, the integral lighting unit comprises a collimator arrangement in which the collimators are arranged so that the first and second beams intersect at least partially in a focal plane overlap region on a focal plane of the optical arrangement so that the projection plane overlap region corresponds to the focal plane overlap region.

A larger beam overlap on the focal plane will be associated with a larger overlap region on the projection plane or screen. However, it is generally desirable to have distinct exit beams with distinct illuminated areas, and a narrow overlap region on the projection plane. The light beams exiting the collimators should preferably only overlap very slightly on the focal plane. Also, since the light on the focal plane originating from a collimator will effectively be used to create the 'image' for the light source, as mentioned above, in a further preferred embodiment of the invention, the integral lighting assembly comprises a collimator arrangement in which light exit openings of the first collimator and the second collimator are located in close proximity to the focal plane of the optical arrangement. Here, the term 'close proximity' is to be understood to mean that the beams overlap only slightly on the focal plane. The actual distance between light exit openings and focal plane will depend on the dimensions of the integral lighting arrangement and the application for which it is intended. For example, using LED light sources in collimators of about 10 mm in length for a high beam/low beam automotive headlamp arrangement, this distance preferably comprises 2 mm, more preferably 1 mm, most preferably 0.5 mm.

To allow the beams to cross, the collimators may be arranged at an angle to each other. However, from a manufacturing point of view, it may be preferable and more economical to mount both light sources on a common, essentially flat carrier instead of having two carriers arranged at an angle. Therefore, in a preferred embodiment of the invention, the integral lighting arrangement preferably comprises a collimator arrangement in which a prism element is mounted onto the light exit opening of one or both collimators. Such a prism element is preferably realized to refract the light beam towards the optical axis, allowing the first and second beams to overlap while at the same time allowing the light sources to be mounted onto a common flat carrier.

Any suitable light source can be used that is sufficiently small and bright and which can be partially enclosed in a collimator. However, in a particularly preferred embodiment of the integral lighting assembly according to invention, the light source comprises an LED source. Very bright thin-film 'white' LEDs are available, for example, the Luxeon® Altilon LED. Without restricting the invention in any way, the first and/or second beams can be generated using one or more such light sources arranged in functional groups. For example, an array of LEDs in a corresponding collimator arrangement can be driven to generate a collective beam of light.

A collimator enclosing a light source for a realization in which the light beams cross before arriving at the secondary optic or optical arrangement can be shaped in any suitable way. For example, the walls of the collimator can be arranged to give a rectangular cross-section (so that the corresponding beam is also essentially rectangular in cross-section) and can have a tapered form, a parallel form, etc. Preferably, the walls are shaped to give a beam of light that essentially retains its cross-section before arriving at the secondary optic. The walls of the collimators are preferably thin enough, so that when collimators are arranged at an angle to touch or almost touch (to allow a crossing of the beams), the light exit openings are as close together as possible. Therefore, a collimator wall thickness of about 0.1 mm to 1 mm is preferable. A collimator for directing its light beam at a region of the secondary optic on the same side of the optical axis is preferably shaped to result in a first/second beam overlap area of at most 20°, as described above. The length of the collimator can be chosen according to the system in which it is to be incorporated. For example, a short collimator with a length of about 6 mm could be used, or a long collimator with a length of about 18 mm. Preferably, for an automotive application such as an integral lighting arrangement for a headlamp, a collimator preferably comprises a near-die collimator with a length in the region of 12 mm, for instance 10-14 mm.

BRIEF DESCRIPTION OF THE DRAWINGS

In the drawings, like numbers refer to like objects throughout. Objects in the diagrams are not necessarily drawn to scale; in particular, the elements and relative positions of an optical arrangement such as a lens and a collimator are only indicated in a very simplified manner.

DETAILED DESCRIPTION OF THE EMBODIMENTS

Figure 1:
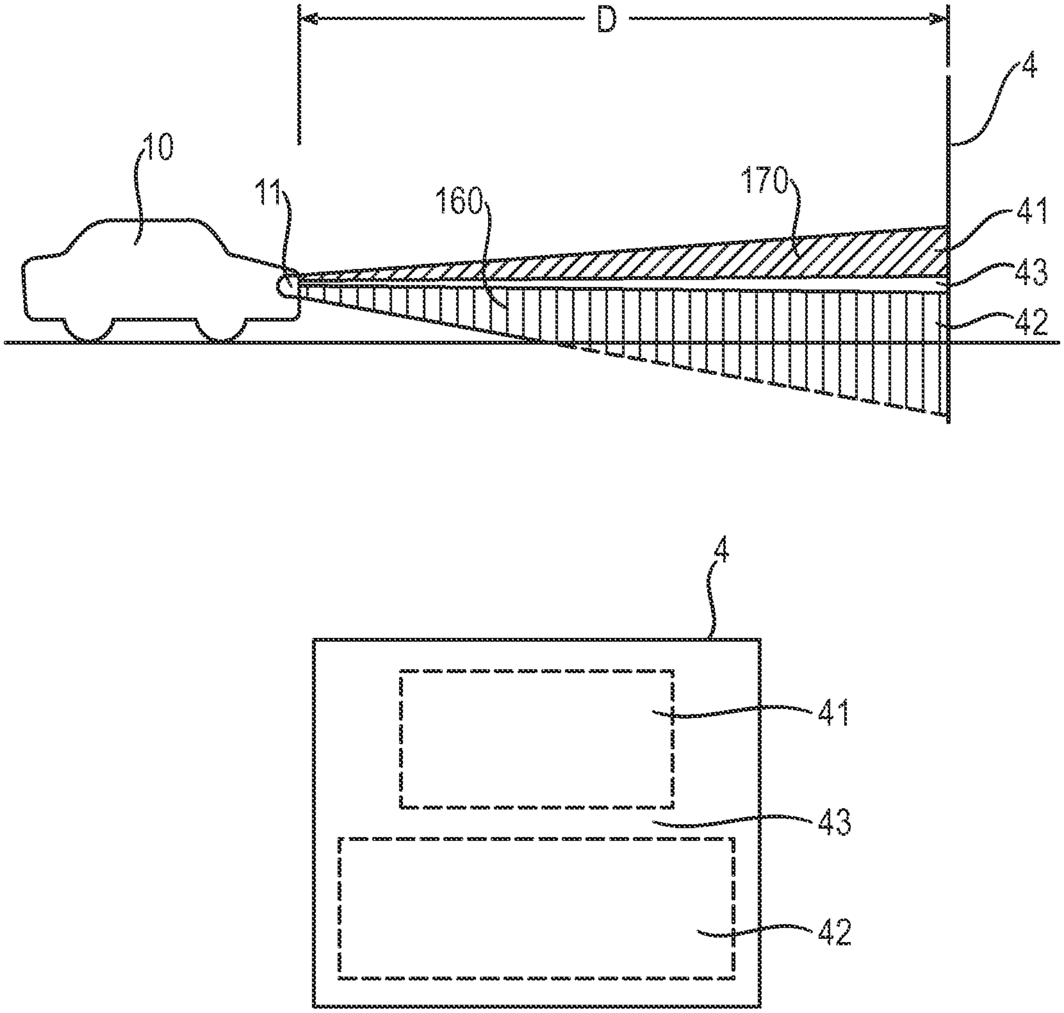
FIG. 1 (prior art)
FIG. 1 is a schematic representation of an automobile with a prior art headlamp arrangement projecting a high beam and a low beam onto a virtual projection screen.

FIG. 1 is a schematic representation of an automobile 10 with a prior art headlamp 11 with a lighting arrangement projecting a low beam 160 and a high beam 170 onto a virtual projection screen 4. In the upper part of the diagram, the virtual screen 4 is shown in a side view at a standard distance D from the headlamp arrangement. According to . . . standard, the distance D must comprise 25 m, and the spatial areas 41, 42 covered by the projections of the low and high beams on the screen must satisfy certain requirements. For example, the low beam 160 must illuminate a certain minimum region 42 to the front and sides of the headlamp. The low beam 160 must be directed towards the side of the automobile away from the centre of the road, so that the verge is better illuminated, while at the same time, the low beam 160 may not be directed at an area too high on the projection plane 4. Similarly, the high beam 170 must illuminate a certain minimum region 41 above the low beam region 110, so that the road is better illuminated over a long distance. The regions 41, 42 illuminated on a virtual screen 4 are shown in a plan view in the lower part of the diagram. This plan view of the virtual screen 4 illustrates the disadvantage of prior art lighting arrangements, showing that the regions 41, 42 covered by the high beam 170 and low beam 160 respectively do not give a complete illuminated area on the virtual screen, but are separated by a gap 43. This gap 43 manifests itself, from a driver's point of view, as a dark region or badly illuminated area, and may compromise the driver's safety or the safety of pedestrians or animals on the verge or roadside.

Figure 2A:
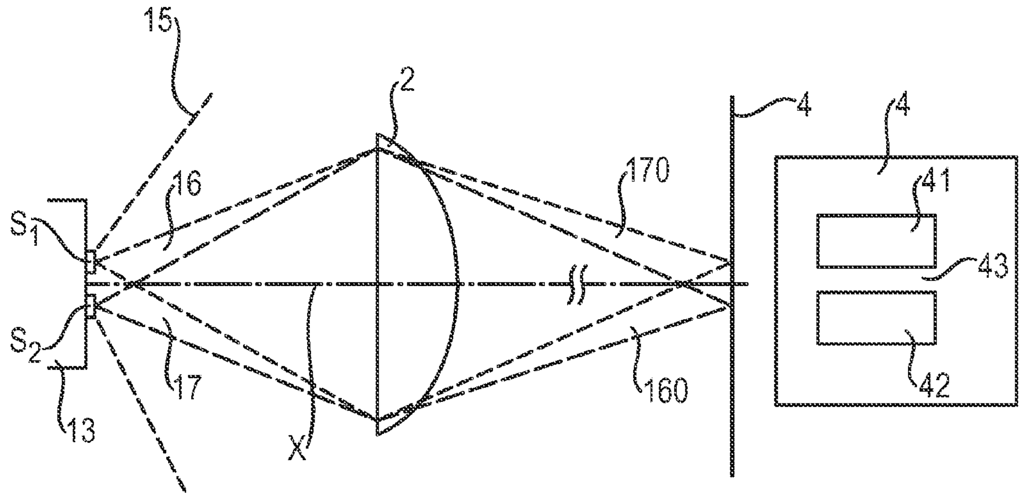
FIG. 2a (prior art)
FIG. 2*a* is a schematic representation of a prior art lighting arrangement for projecting a high beam and a low beam onto a virtual projection screen.

FIG. 2*a* is a schematic representation of a prior art lighting arrangement for projecting a high beam 170 and a low beam 160 onto a virtual projection screen 4, and makes clear how the non-illuminated area 43 can arise. Obviously, the dimensions and distances in this and the following diagrams are rendered in an overly-simplified manner and are only intended to be explanatory in purpose. Here, two light sources $S_1$, $S_2$ are mounted on a carrier 13 or substrate 13 located behind a lens 2 in a headlight arrangement. One light source $S_1$ is located 'above' an optical axis X, and the beam of light 16 originating from this light source $S_1$ is imaged in a first exit beam 160 or low beam 160 to give the low beam projection 42 on the virtual screen. The other light source $S_2$ is located 'below' the optical axis X, and the beam of light 17 originating from this light source $S_2$ is imaged in a second exit beam 170 or high beam 170 to give the high beam projection 41 on the virtual screen 4. In this realization, the light sources emit in a Lambertian manner, so that a large proportion of the light output is lost, as indicated by the lines 15. The image 42 made of the upper light source $S_1$ is indicated by lines originating from the centre of the light source $S_1$, which converge at a point on the virtual screen 4 corresponding to the centre of the light source image 42 in the first exit beam 160. Similarly, the image 41 made of the lower light source $S_2$ is indicated by lines originating from the centre of the light source $S_2$, which converge at a point on the virtual screen 4 corresponding to the centre of the light source image 41 in the second exit beam 170 (for the sake of clarity, only the points describing the centre of a light source and its corresponding point in the image of that light source are shown in the diagram). The gap between the light sources $S_1$, $S_2$ is also 'imaged' as the gap 43 between the regions 41, 42 on the screen. However, because two clearly distinct imaged regions are required at the projection plane distance, it is not possible to simply place the light sources $S_1$, $S_2$ directly beside one another.

Figure 2B:
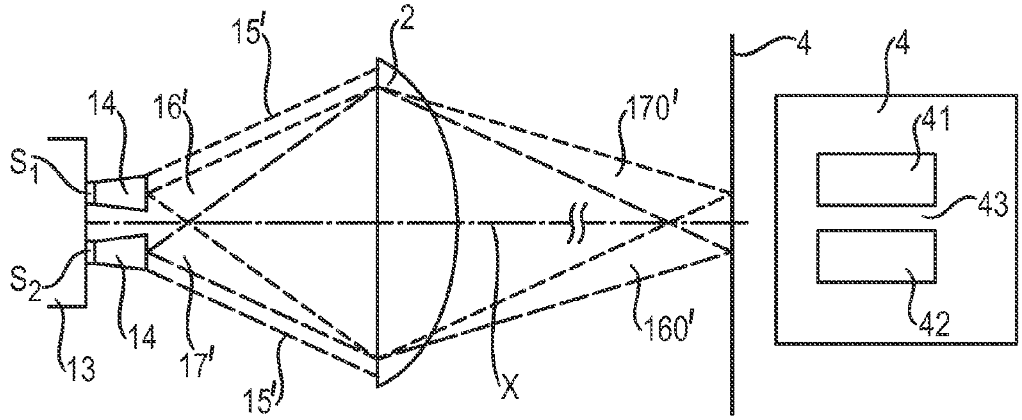
FIG. 2b (prior art)
FIG. 2*b* is a schematic representation of a further prior art lighting arrangement for projecting a high beam and a low beam onto a virtual projection screen.

FIG. 2*b* is a schematic representation of a further prior art lighting arrangement for projecting a high beam 170' and a low beam 160' onto a virtual projection screen 4. Here, each light source $S_1$, $S_2$ is located in a collimator $C_1$, $C_2$, so that more of the light can be used to render the light source images 41, 42 on the virtual screen 4. However, the light sources $S_1$, $S_2$ are still separate, so that the effective gap between the light sources $S_1$, $S_2$ (or the light exit openings of the collimators $C_1$, $C_2$) also results in a corresponding gap 43 between the images regions 41, 42 on the virtual screen 4.

Figure 3:
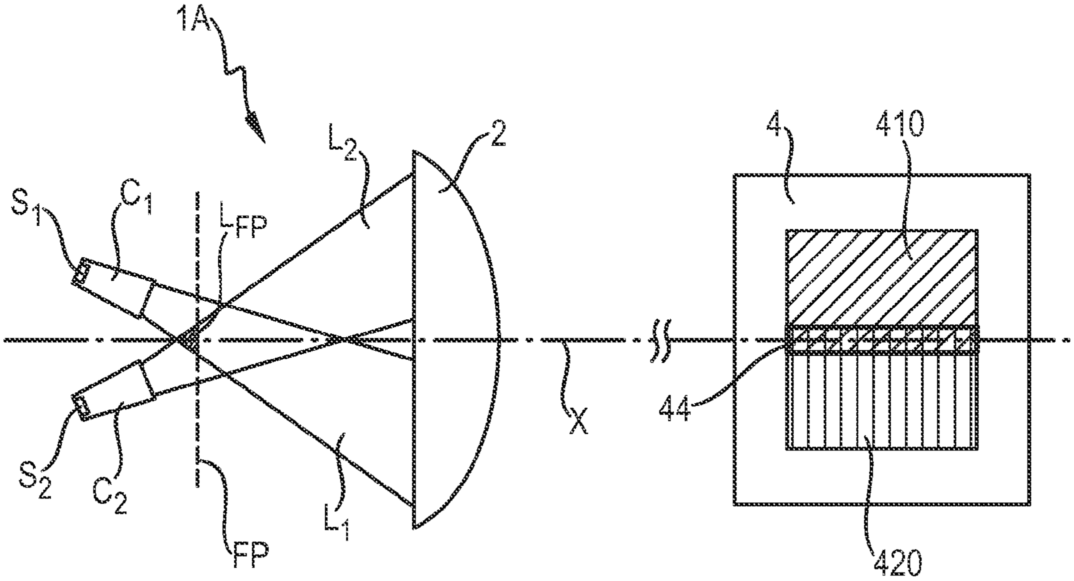
FIG. 3 is a schematic representation of an integral lighting arrangement according to a first embodiment of the invention.

FIG. 3 is a schematic representation of an integral lighting arrangement 1A according to a first embodiment of the invention. Here, a pair of collimators $C_1$, $C_2$ each enclosing a light source $S_1$, $S_2$ is arranged behind an optical arrangement 2, in this case a projection lens 2, so that the light exit openings of the collimators $C_1$, $C_2$ are situated close to and behind the focal plane FP of the lens 2. Furthermore, the collimators $C_1$, $C_2$ are arranged so that each collimator directs its beam of light essentially at a part of the lens 2 on the opposite side of the optical axis X as the collimator. The term 'optical axis' is to be understood as an imaginary line defining the path of light propagation through the lens. In the case of an essentially symmetrical lens as shown here, the optical axis may be an axis of rotational symmetry of the lens. As the diagram shows, the first collimator $C_1$ (above the optical axis X) directs its beam of light $L_1$ at the lower part of the lens 2 (below the optical axis X), while the second collimator $C_2$ (below the optical axis X) directs its beam of light $L_2$ at the upper part of the lens 2 (above the optical axis X). The 'tight' light cones $L_1$, $L_2$ emitted by the collimators $C_1$, $C_2$ can be obtained, for example, by using collimators $C_1$, $C_2$ with essentially parallel side walls. The collimators $C_1$, $C_2$ are arranged so that the light beams $L_1$, $L_2$ partially intersect (as indicated by the shaded area) to give a focal plane overlap area $L_{FP}$ on the focal plane FP (indicated by the thicker line). An image of the 'object' in the focal plane FP is projected onto the virtual screen 4 to give a high-beam region 410 corresponding to the second light beam $L_2$, and a low-beam region 420 corresponding to the first light beam $L_1$. An overlap area 44 on the projection screen, being the overlap between the high-beam region 410 and the low-beam region 420, is effectively the 'image' of the focal plane overlap area $L_{FP}$ on the focal plane FP of the lens 2, and is emphasized by the thick black line. This overlap area 44 ensures that, from the driver's point of view, the area illuminated by the headlamps is optimally illuminated, without any 'dark gap' or non-illuminated area between low beam and high beam.

Figure 4:
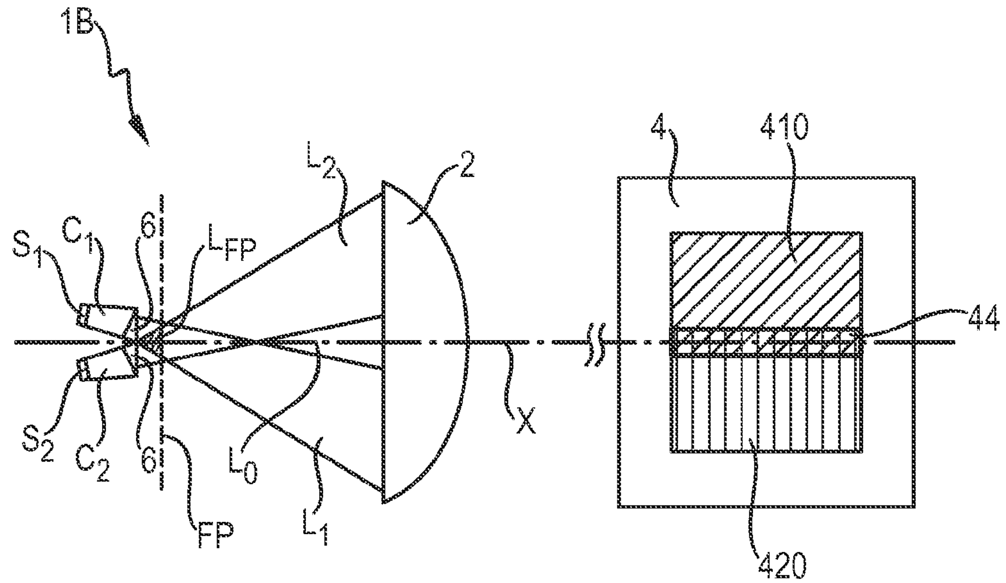
FIG. 4 is a schematic representation of an integral lighting arrangement according to a second embodiment of the invention.

FIG. 4 is a schematic representation of an integral lighting arrangement 1B according to a second embodiment of the invention. This realization is a further development of the realization of FIG. 3 described above. Here, the light beams $L_1$, $L_2$ exiting the collimators $C_1$, $C_2$ are first refracted by prism elements 6 mounted at the light exit openings of the collimators $C_1$, $C_2$, resulting in a larger focal plane overlap area $L_{FP}$ on the focal plane FP. This results in a better, larger overlap region 44 on the virtual screen 4, as indicated by the thicker black line.

Figure 5:
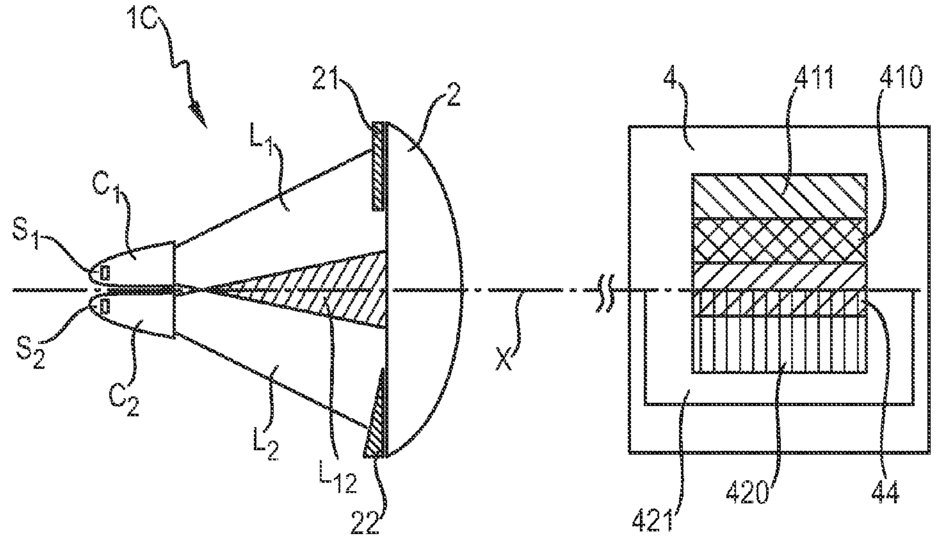
FIG. 5 is a schematic representation of an integral lighting arrangement according to a third embodiment of the invention.

FIG. 5 is a schematic representation of an integral lighting arrangement 1C according to a third embodiment of the invention. The principle of operation is different in this realization compared to the previous two embodiments. Here, a pair of collimators $C_1$, $C_2$ each enclosing a light source $S_1$, $S_2$ is arranged behind a projection lens 2, but the collimators are arranged so that each collimator directs its beam of light essentially at a part of the lens 2 on the same side of the optical axis X as the collimator. A first beam $L_1$ is generated by the light source $S_1$ in the first collimator $C_1$, and is directed largely at the top half of the lens above the optical axis X. A second beam $L_2$ is generated by the light source $S_2$ in the second collimator $C_2$, and is directed largely at the bottom half of the lens below the optical axis X. The conical light cones $L_1$, $L_2$ emitted by the collimators $C_1$, $C_2$ can be obtained, for example, by using collimators $C_1$, $C_2$ with an essentially parabolic shape. The collimators $C_1$, $C_2$ could also be realized as a bi-cavity collimator with a dividing wall, and wherein the outer walls of each collimator $C_1$, $C_2$ have a parabolic shape and the focal point of the parabola is located close to the common dividing wall. The projection lens 2 is equipped with additional functional elements 21, 22. A spreading element 21 is attached to the rear of the lens 2 towards the top, and a shifting element 22 is attached to the rear of the lens towards the bottom. Part of the first light beam $L_1$ arrives at a central region of the lens 2, mostly in the upper half, and is projected onto a region 420 of the virtual screen. The rest of the first beam $L_1$ arrives at the spreading element 21 and is spread and subsequently projected onto a region 421 on the virtual screen 4. The second beam arrives mostly in the lower half of the lens above the shifting element 22, and is projected onto a high-beam region 410 of the virtual screen 4. The remainder of the second beam arrives at the shifting element 22 where it is refracted and subsequently projected onto a shifted high-beam region 411 on the virtual screen 4.

Figure 6:
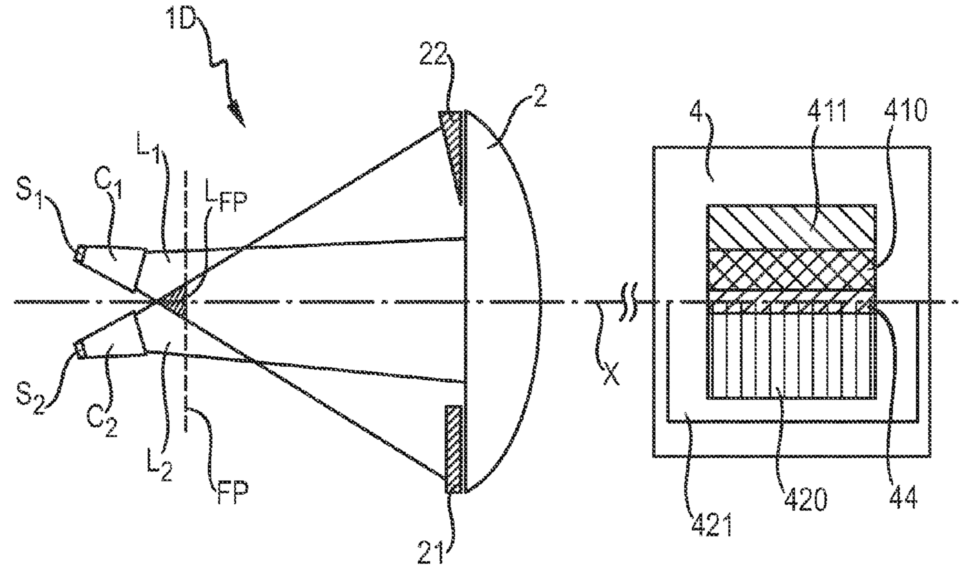
FIG. 6 is a schematic representation of an integral lighting arrangement according to a fourth embodiment of the invention.

FIG. 6 is a schematic representation of an integral lighting arrangement 1D according to a fourth embodiment of the invention. This realization is a combination of the principles of operation of the previous embodiments. Again, the collimators $C_1$, $C_2$ are arranged so that the first and second light beams $L_1$, $L_2$ intersect before the focal plane FP, but the lens 2 is also augmented by shifting element 22 and a spreading element 21. Because the collimators $C_1$, $C_2$ are arranged to direct their light beams $L_1$, $L_2$ across the optical axis X, the shifting element 22 is attached to the upper region of the lens 2, and the spreading element 21 is attached to the lower region of the lens 2. Parts of the first beam $L_1$ and second beam $L_2$, arriving at the lens 2 between the spreading element 21 and the shifting element 22, result in a low-beam region 420 and high-beam region 410 respectively on the virtual screen 4. The focal plane overlap area $L_{FP}$ on the focal plane FP is projected as the overlap area 44 on the virtual screen 4, while the spreading element 21 results in a more optimal low-beam region 421, and the shifting element 22 results in an improved high-beam region 411.

Figure 7:
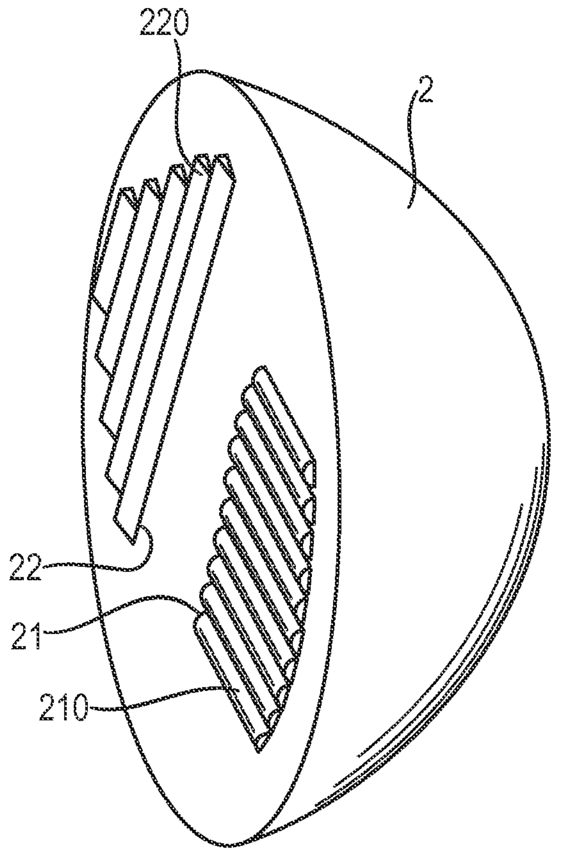
FIG. 7 shows a projection lens with added functional elements for use in an integral lighting arrangement according to the invention.

FIG. 7 shows a projector lens 2 with added functional elements 21, 22 for use in the embodiments of the lighting arrangement according to the invention described in FIGS. 5 and 6 above. In this realization, the shifting element 22 comprises a series of flat prism elements 220 directed to refract the incoming light away from the optical axis of the lens. This shifting element 22 is used to obtain the optimized high-beam region 411 on the virtual screen 4. The spreading element 21 comprises a series of cylindrical lenses 210 which act to spread the incoming light at this region of the lens 2, and which are used to obtain the wider low-beam region 421 on the virtual screen 4.

Figure 8:
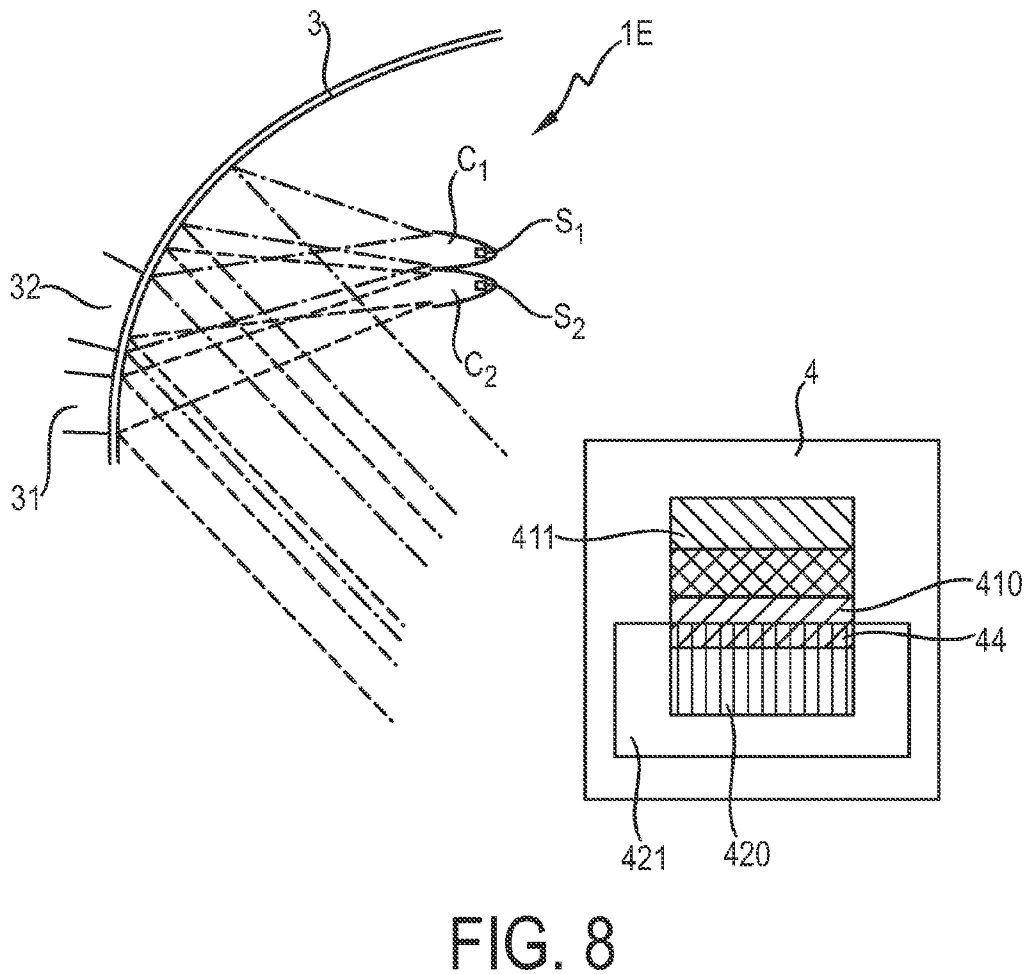
FIG. 8 is a schematic representation of an integral lighting arrangement according to a fifth embodiment of the invention.

FIG. 8 is a schematic representation of an integral lighting arrangement 1E according to a fifth embodiment of the invention. Here, instead of a projection lens, a reflector 3 is used to direct the light out of the lighting arrangement 1. The reflector 3 is only schematically indicated in a simplified manner by the curved line, which represents a part of an essentially parabolic open-ended reflector. The pair of collimators $C_1$, $C_2$ are both arranged above an optical axis of the reflector 3 so that images of the light sources $S_1$, $S_2$ can be made without any 'shadow' of the collimator arrangement. The actual paths travelled by the light beams in three-dimensional space can only be indicated here in the diagram. Basically, some of the light issued by the first collimator $C_1$ is directed at a spreading element 31 of the reflector 3. Similarly, some of the light issued by the second collimator $C_2$ is directed at a shifting element 32 of the reflector. 3 These spreading and shifting elements 31, 32 can simply be appropriately shaped regions of the reflector 3, or they can be additional optical elements attached at appropriate positions on the inside wall of the reflector 3. The reflector 3 is designed to direct the light exiting the collimators $C_1$, $C_2$ to a low-beam region 420, a spread low-beam region 421, a high-beam region 410, and a shifted high-beam region 411 on a virtual screen 4. Again, an overlap region 44 is given by the overlap between the high-beam region 410 and the low-beam region 420.

Figure 9:
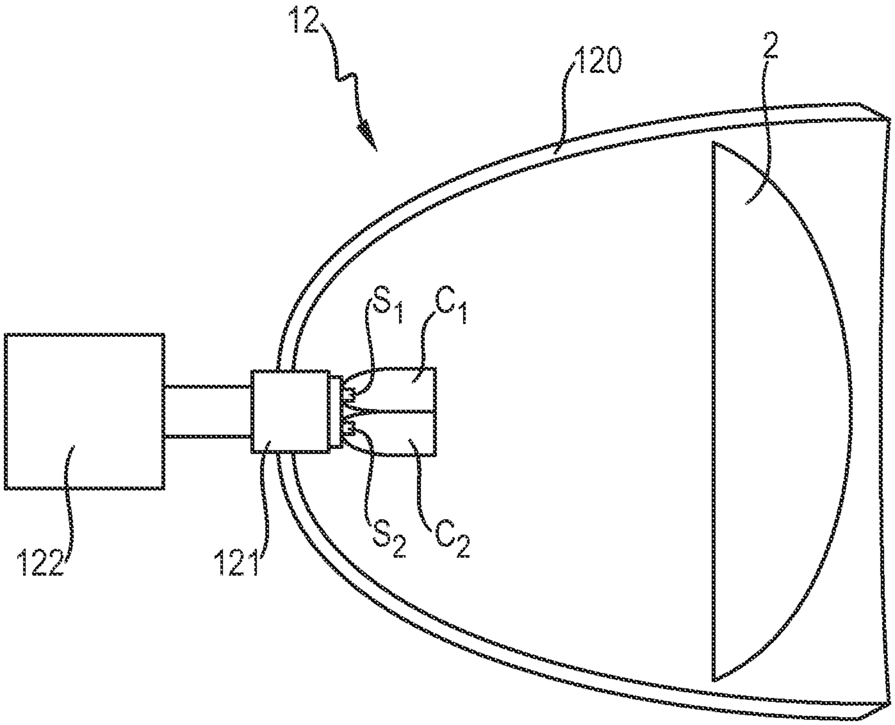
FIG. 9 is a schematic representation of a headlamp arrangement according to an embodiment of the invention.

FIG. 9 is a schematic representation of a headlamp arrangement 12 according to an embodiment of the invention, and shows a optical arrangement comprising a pair of light sources $S_1$, $S_2$ arranged in a pair of collimators $C_1$, $C_2$ located behind a projection lens 2 in a housing 120. The light sources $S_1$, $S_2$, here LED light sources $S_1$, $S_2$ of a type such as Luxeon® Altilon, are mounted on a suitable heat sink 121. One or both of the collimators can be mounted on a moveable base which can be controlled to tilt the collimator towards or away from the optical axis X of the projection lens 2. A driver 122 supplies the necessary control signals for activating one or both of the light sources $S_1$, $S_2$, for example according to a user input (deliberately turning a high beam on), in response to a sensor (which may detect if the vehicle is passing over a crest of a hill or if the vehicle is turning into a corner), or in response to another appropriate control signal. For any situation then, the collimators $C_1$, $C_2$ of the lighting arrangement can be controlled so that the low beam and high beam optimally overlap in an overlap region as described above.

Figure 10:
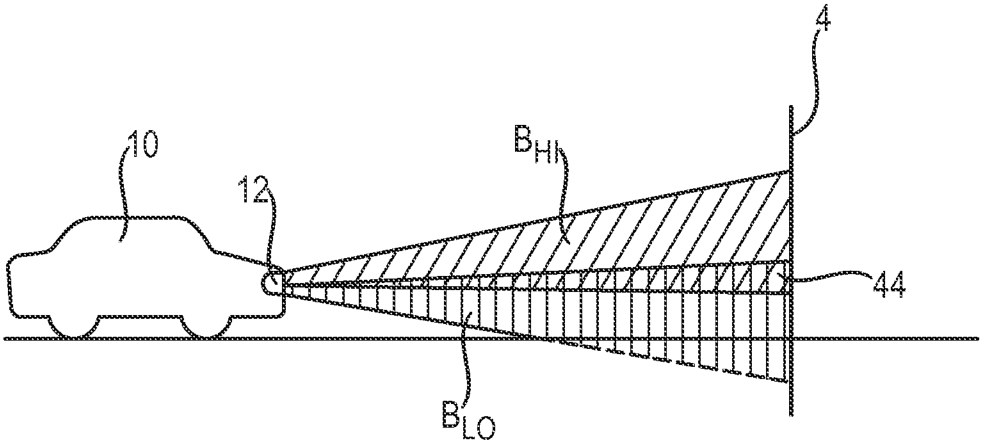
FIG. 10 is a schematic representation of an automobile with a headlamp arrangement of FIG. 8 for projecting a high beam and a low beam onto a virtual projection screen.

FIG. 10 is a schematic representation of an automobile 10 with a headlamp arrangement 12 of FIG. 8 for projecting a high beam $B_{HI}$ and a low beam $B_{LO}$ onto a virtual projection screen 4 at a distance of 25 m from the headlamp arraignment 12. Using any of the embodiments described in FIGS. 3-7 to manipulate the low and high beams $B_{LO}$, $B_{HI}$, an optimal overlap region 44 can be obtained on the virtual screen 4, ensuring in increase in safety of the driver and other road-traffic participants.

Although the present invention has been disclosed in the form of preferred embodiments and variations thereon, it will be understood that numerous additional modifications and variations could be made thereto without departing from the scope of the invention. The integral lighting arrangement described herein can be used for any combination of two different types of light, for example high-beam/DRL (daytime running lights), fog/DRL, high-beam/fog, etc.

For the sake of clarity, it is to be understood that the use of "a" or "an" throughout this application does not exclude a plurality, and "comprising" does not exclude other steps or elements.

The invention claimed is:

1. An integral lighting assembly comprising:

an optical arrangement;

a first light source for generating a first beam of light;

a first collimator for directing the first beam at the optical arrangement;

a second light source for generating a second beam of light; and a second collimator for directing the second beam at the optical arrangement;

wherein the collimators are arranged such that each collimator on one side of an optical axis of the lighting assembly directs its beam of light essentially at a region of the optical arrangement on the other side of the optical axis such that at least a portion of the first beam and at least a portion of the second beam cross the optical axis at a common point on the optical axis before arriving at the optical arrangement, wherein the optical arrangement is configured to manipulate the first beam to provide a low exit beam and to manipulate the second light beam to provide a high exit beam such that the low exit beam and the high exit beam are partially combined in an overlap region on a projection plane located at a predefined distance from the integral lighting assembly and such that a majority of the high exit beam is non-overlapping with respect to the low exit beam in the projection plane, and wherein the optical arrangement comprises a first lens and comprises, on a surface of said first lens, a plurality of linear prism elements and a plurality of linear lenses that are oriented on said surface essentially perpendicular to the linear prism elements such that one of said first beam and said second beam intersects said plurality of liner prism elements and the other of said first beam and said second beam intersects said plurality of linear lenses.

2. The integral lighting assembly according to claim 1, wherein the plurality of linear lenses compose a spreading element for horizontally spreading any light incident at the spreading element and the plurality of linear prism elements compose a shifting element for vertically shifting any light incident at the shifting element.

3. The integral lighting assembly according to claim 2 wherein the spreading element is configured to spread at least part of the first beam prior to manipulation by the first lens such that the low exit beam is projected to give two overlapping first beam regions in the projection plane.

4. The integral lighting assembly according to claim 2, wherein the shifting element is configured to shift at least part of the second beam prior to manipulation by the first lens such that the high exit beam is projected to give two overlapping second beam regions in the projection plane.

5. The integral lighting assembly according to claim 2, wherein the first lens is a projection lens and wherein the shifting element is arranged to vertically shift the light incident at the shifting element prior to refraction by the projection lens.

6. The integral lighting assembly according to claim 2, wherein the first lens is a projection lens and wherein the plurality of linear lenses are a plurality of cylindrical lens elements and are arranged to refract and horizontally spread the light incident at the spreader element prior to refraction by the projection lens.

7. The integral lighting assembly according to claim 1, wherein the first lens is a projection lens.

8. The integral lighting assembly according to claim 1, wherein the first and second beams intersect at least partially in a focal plane overlap region on a focal plane of the optical arrangement so that the projection plane overlap region corresponds to the focal plane overlap region.

9. The integral lighting assembly according to claim 1, comprising a collimator arrangement in which light exit openings of the first collimator and the second collimator are located in close proximity to the focal plane of the optical arrangement.

10. The integral lighting assembly according to claim 1, comprising a collimator arrangement in which at least one of the first or second collimators comprises a prism element at its corresponding light exit opening, wherein the prism element of the collimator arrangement is configured to refract the corresponding beam of light towards the optical axis.

11. The integral lighting assembly according to claim 1, wherein at least one of the first or second light sources comprises an LED source.

12. The integral lighting assembly according to claim 1, wherein at least one of the first or second collimators comprises a near-die collimator with a length of between 6 mm and 18 mm.

13. The integral lighting assembly according to claim 1, wherein the optical arrangement is further configured to manipulate the first and second light beams such that a majority of the low exit beam is non-overlapping with respect to the high exit beam in the projection plane.

14. The integral lighting assembly according to claim 13, wherein the predefined distance is 25 meters.

15. An automotive headlamp arrangement comprising the integral lighting assembly according to claim 1.

16. An integral lighting assembly comprising an optical arrangement;

a first light source for generating a first beam of light;

a first collimator for directing the first beam at the optical arrangement;

a second light source for generating a second beam of light; and a second collimator for directing the second beam at the optical arrangement, wherein the collimators are arranged such that each collimator on one side of an optical axis of the lighting assembly directs its beam of light essentially at a region of the optical arrangement on the other side of the optical axis such that the first beam crosses the second beam before arriving at the optical arrangement, wherein the optical arrangement is configured to manipulate the first and second light beams to give a low exit beam and a high exit beam such that the low exit beam and the high exit beam are partially combined in an overlap region on a projection plane located at a predefined distance from the integral lighting assembly, and wherein the optical arrangement comprises a first lens and comprises, on a surface of said first lens, a plurality of linear prism elements and a plurality of linear lenses that are oriented on said surface essentially perpendicular to the linear prism elements such that one of said first beam and said second beam intersects said plurality of liner prism elements and the other of said first beam and said second beam intersects said plurality of linear lenses.

* * * * *